F. W. RICE.
PUZZLE.
APPLICATION FILED AUG. 12, 1913.

1,129,604.

Patented Feb. 23, 1915.
2 SHEETS—SHEET 1.

Witnesses

Inventor
F. W. Rice
By
Attorneys.

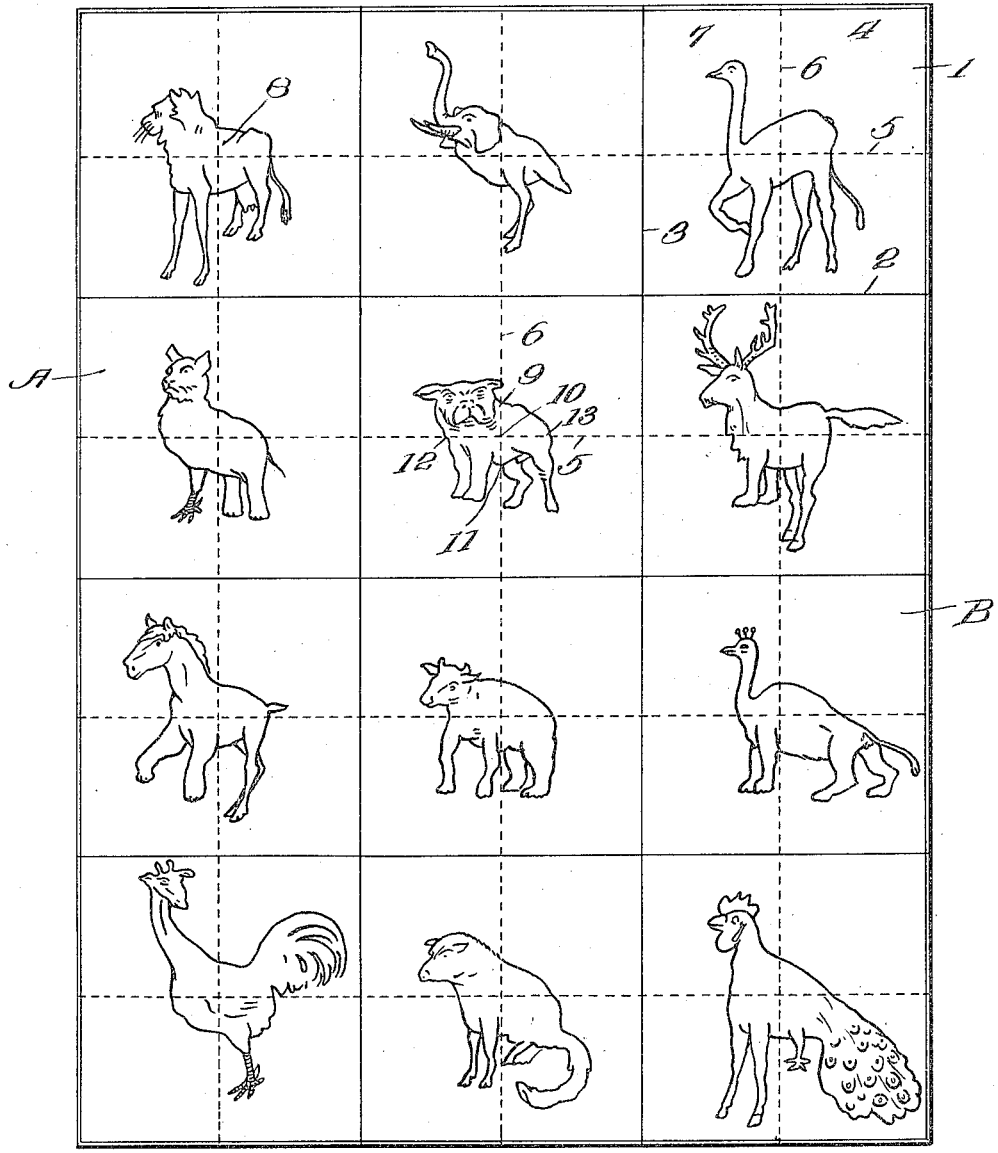
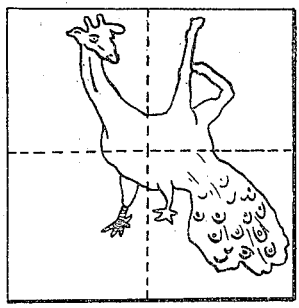

UNITED STATES PATENT OFFICE.

FREDERICK W. RICE, OF EAST SEATTLE, WASHINGTON.

PUZZLE.

1,129,604.        Specification of Letters Patent.        Patented Feb. 23, 1915.

Application filed August 12, 1913. Serial No. 784,403.

*To all whom it may concern:*

Be it known that I, FREDERICK WILLIAM RICE, a citizen of the United States, residing at East Seattle, in the county of King and State of Washington, have invented certain new and useful Improvements in Puzzles, of which the following is a specification.

This invention relates to puzzles and more particularly to that class known as picture puzzles, the puzzle being in the form of a printed sheet of a suitable weight and thickness having depicted thereon various grotesque figures each located within a well defined area, the sheet being designed to be cut along intersecting lines transecting the several areas, and the object of the puzzle being to so rearrange the divided portions as to construct figures of proper form, such for example as animals, fowls, etc.

It is one aim of the invention to so divide each separate area or field of the sheet with respect to the outline of the figure depicted thereon that the lines defining the outlines of the figure portions will register with the ends of the lines defining the outline of any of the other figure portions when disposed in the relative position occupied by it in the area of which it originally formed a part, when arranged within or forming a part of a new assemblage of the figure portions or subdivisions of other areas or fields.

It is an aim of the invention to provide in a puzzle having the general characteristics above mentioned, such an arrangement of areas and subdivisions of areas that an almost endless variety of grotesque figure arrangements may be secured by interchanging the divided portions of the areas into which the sheet is divided, to form new picture areas, the puzzle when so used affording considerable amusement and inducing the exercise of ingenuity in the production of figures grotesque and comical in appearance.

Figure 1:
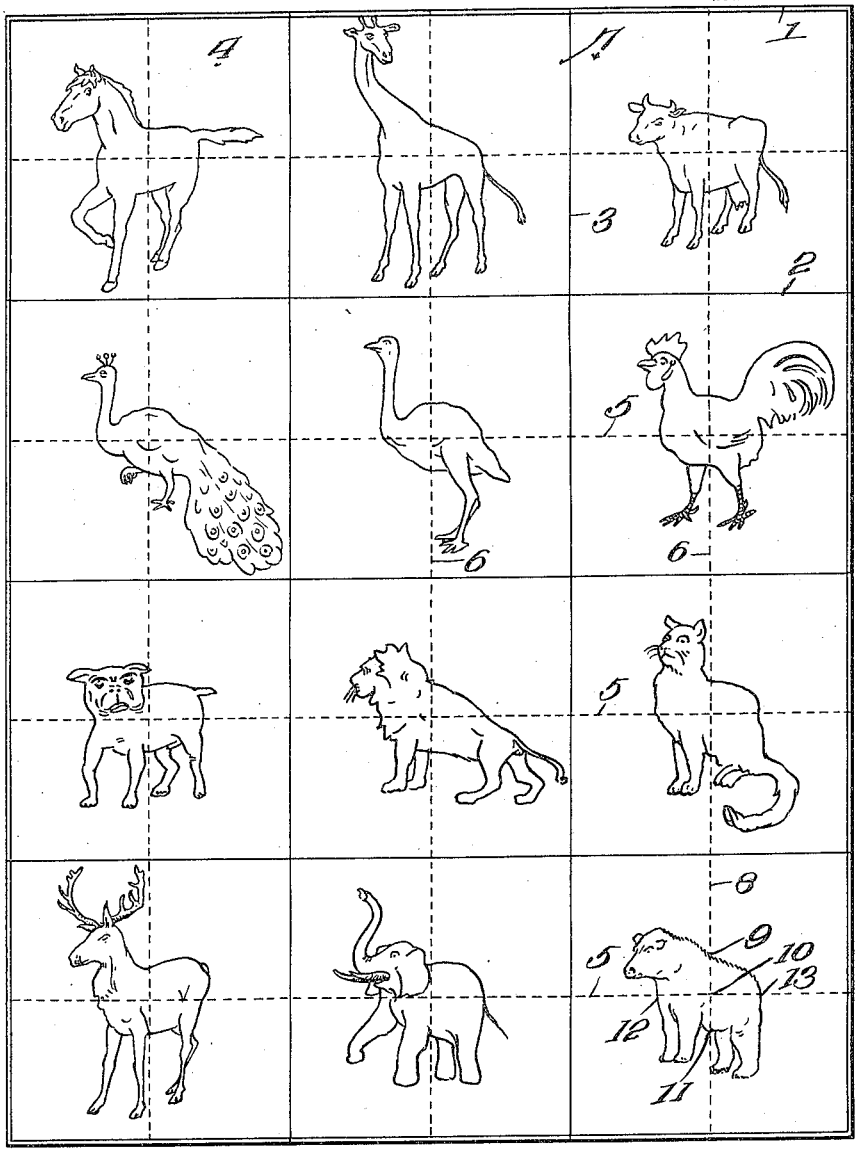
Figure 3:
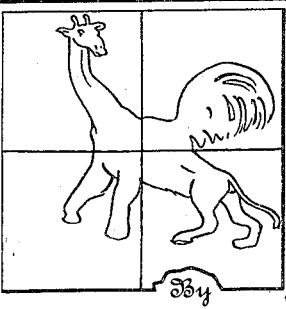

In the accompanying drawings: Figure 1 is a plan view of the sheet comprising the puzzle, the picture areas into which the sheet is divided being divided on the face of the sheet by full lines and the subdivisions constituting the areas being divided on the face of the sheet by dotted lines; Fig. 2 is a view similar to Fig. 1 but illustrating the subdivisions of the grotesque picture areas in Fig. 1 rearranged to form picture areas in which the images are depicted in their proper form; and Fig. 3 is a view illustrating one of the many arrangements of the subdivisions which may be made to form a grotesque picture area. Fig. 4 is a view similar to Fig. 3, illustraing another arrangement of the subdivisions.

In the drawings and particularly in Fig. 1 thereof, in which figure the puzzle is shown in its initial condition, the same consists of a sheet of any suitable material indicated by the numeral 1 which sheet is, however, preferably relatively thick so that when cut into sections in a manner to be presently explained, the sections or divided portions may be conveniently fitted together edge to edge. In fact, if found desirable, blocks having faces corresponding to the divided portions of the sheet may be employed and the blocks placed face to face in working the puzzle or in securing grotesque arrangements. The face of the sheet 1 is divided by a number of horizontal lines 2 and vertical lines 3 into a number of picture areas 4 which in the present instance have the outline of a square and are all of the same dimensions. The face of the sheet is also divided by horizontal lines 5 and vertical lines 6 which lines transect the picture areas 4 and intersect at the centers of the areas so that the lines 5 and 6 transecting each picture area divide the area into four equal squares.

For convenience in describing the invention and in order that the objects thereof may be more readily understood the lines 2 and 3 which divide the face of the sheet into the several picture areas are full lines and the lines 5 and 6 which subdivide the picture areas are dotted lines.

While as stated in the present instance the puzzle is initially in the form of a sheet divided as above described, it may be placed upon the market in the form of a number of sections or squares corresponding to the sections formed by cutting along the lines 5 and 6 and indicated in the drawings by the numeral 7.

Within the bounds of each of the picture areas 4 there is printed or otherwise depicted a figure indicated in general by the numeral 8 and in the preferred form of the invention and where the puzzle is placed upon the market in sheet form, these figures are grotesque in appearance and comprise a combination of different portions of the bodies of different animals or fowls. For example, in one of the picture areas indicated specifically in Fig. 1 by the character A, there is shown a figure the head and shoulder portions of which resemble the head and shoulders of a cat; the breast and leg portions, the breast and one leg of a rooster; the back and upper rump portions, the back of a lion; and, the rear legs and lower rump portion, the rear legs and lower rump portion of an elephant. In another one of the picture areas indicated specifically by the reference character B the portions above mentioned represent in the order named, the head and neck of a peafowl, the fore legs of a cat, the back of a giraffe, and the trunk and rump portions and hind legs of a lion.

In printing or otherwise depicting the figures 8 within their respective picture areas 4, the figures are so arranged within the areas that the point of intersection of the outline of the back with the line 6 vertically dividing the area, as indicated at 9, will be spaced from the point of intersection of the lines 5 and 6 within the area, and indicated at 10, a distance equal to the distance between the point 10 and the point of intersection of the lower outline of the body with the said vertical line 6 as indicated at 11; and the distance between the point of intersection of the breast outline with the line 5 as indicated at 12 will be spaced from the point 10 a distance equal to the space between the said point 10 and the point of intersection of the rump or back outline of the figure with the line 5 as indicated at 13. This relative location of the points 9 and 11 and 12 and 13 to the point 10, is the same in the instance of all of the figures and the lines 5 and 6 dividing the areas within which they are located, and furthermore the actual distance is the same as concerns the distance between each point 9 and 11 and the point 10 and each point 12 and 13 and the said point 10. As a result of this like arrangement of each figure within its respective picture area the sections into which the whole number of areas are divided may be interchangeably arranged to secure various combinations so long of course as they maintain their initial relative location or position in the newly formed or constructed area. In other words, that subdivision of the area B in which is outlined the head of a peafowl, may replace the subdivision of the area A in which is outlined the head of a cat so that the area A would then contain a grotesque figure having the head of a peafowl, the back of a lion, the breast and one leg of a rooster, and the hind legs and rump of an elephant.

As before stated, it is the object of the invention to rearrange the sections 4 so as to produce animal or other figures of proper form, it being understood that the sheet is first cut along the lines 2 and 3 so as to separate the various picture areas and that each area is then cut along the lines 5 and 6 so as to form the sections or subdivisions 4. It will be understood of course that when the various subdivisions of the sheet have been assembled so as to produce the proper number of figures of proper form the puzzle will have been solved and it will further be apparent that the subdivisions may be arranged in various groups so as to form picture areas in which the figures will be of grotesque appearance and that the number of combinations which may be secured in this manner is practically unlimited. One of such arrangements of the subdivisions is shown in Fig. 3 of the drawings and in this view the figure within the picture area has the head of a giraffe, the back and tail of a rooster, the fore legs of an elephant, and the trunk and hind legs of a lion. It will be understood of course that any desired number of the picture areas may be contained in any one sheet and that figures other than animals and fowls may be depicted therein.

Having thus described the invention, what is claimed as new is:

1. A picture puzzle consisting of a plurality of members divided both vertically and horizontally and having a figure depicted centrally thereon, the outline of the figure crossing the horizontal division at opposite sides of and at equal distance from the vertical division, and crossing the vertical division at opposite sides of and at equal distance from the horizontal division.

2. A picture puzzle consisting of a plurality of members divided by intersecting lines into quarters and having a figure depicted centrally thereon, the outline of the figure crossing one of the lines at opposite sides of and at equal distances from the other line and crossing the last-mentioned line at opposite sides of and at equal distances from the first-mentioned line, diagonally opposite ones of the quarters being transposable in reversed position.

In testimony whereof I affix my signature in presence of two witnesses.

FREDERICK W. RICE. [L. S.]

Witnesses:
 JAMES E. MCGREW,
 MABEL M. MILLER.